(12) United States Patent
Bohm et al.

(10) Patent No.: US 6,409,260 B1
(45) Date of Patent: Jun. 25, 2002

(54) ADJUSTMENT DEVICE FOR A MULTI-SPOILER ROOF FOR VEHICLES

(75) Inventors: Horst Bohm; Rainer Grimm, both of Frankfurt (DE)

(73) Assignee: Meritor Automotive GmbH, Frankfurt (DE)

( * ) Notice: Subject to any disclaimer, the term of this patent is extended or adjusted under 35 U.S.C. 154(b) by 0 days.

(21) Appl. No.: 09/673,363

(22) PCT Filed: Feb. 5, 2000

(86) PCT No.: PCT/EP00/00918

§ 371 (c)(1),
(2), (4) Date: Dec. 26, 2000

(87) PCT Pub. No.: WO00/48857

PCT Pub. Date: Aug. 24, 2000

(30) Foreign Application Priority Data

Feb. 15, 1999 (DE) .......................... 299 02 662

(51) Int. Cl.⁷ .............................. B60J 7/047
(52) U.S. Cl. .................................. 296/220.01
(58) Field of Search .................... 296/220.01

(56) References Cited

U.S. PATENT DOCUMENTS

| | | | |
|---|---|---|---|
| 5,484,185 A | 1/1996 | Salz et al. | |
| 5,836,642 A | 11/1998 | Salz | |
| 5,897,160 A | 4/1999 | Reihl et al. | |
| 6,264,270 B1 * | 7/2001 | Farmont | 296/220.01 X |

FOREIGN PATENT DOCUMENTS

| | | |
|---|---|---|
| DE | 37 37 725 C1 | 12/1988 |
| DE | 43 29 580 C1 | 1/1994 |
| DE | 43 29 583 | 10/1994 |
| DE | 44 04 618 C1 | 3/1995 |
| DE | 44 07 286 C1 | 5/1995 |
| DE | 195 25 839 C1 | 8/1996 |
| DE | 195 29 522 C1 | 8/1996 |
| DE | 195 29 702 C1 | 9/1996 |
| DE | 196 08 916 C1 | 4/1997 |
| EP | 0 218 020 | 7/1986 |

OTHER PUBLICATIONS

International Search Report, dated Jun. 7, 2000.

* cited by examiner

*Primary Examiner*—Dennis H. Pedder
(74) *Attorney, Agent, or Firm*—Vickers Daniels & Young (57) ABSTRACT

The invention relates to an adjusting device for a sunroof (11) of a vehicle. Said sunroof (11) is provided with at least two lamellae (12A, 12B, 12C). The roof opening (14) which is to be closed is defined by a base component (13) that is fixedly mounted to the vehicle and that has opposing side parts (18). The adjusting device comprises lamellae support elements (20A, 20B, 20C), a lamellae carrier slide (30A, 30B, 30C) and control means (26A, 28A; 26B, 28B; 26C, 28C). A drive slide (29) is provided which is displaceably arranged in the guiding element (32) in front of the lamellae carrier slide (30A, 30B, 30C). Pivoting means and coupling means are provided for pivoting a lamella and for connecting and separating two slides.

15 Claims, 7 Drawing Sheets

ADJUSTMENT DEVICE FOR A MULTI-SPOILER ROOF FOR VEHICLES

The invention involves an adjustment device for a sliding roof of a vehicle, having at least two lamellas for a choice of closing and at least partially uncovering a roof opening in a fixed roof surface of a vehicle (multiple-spoiler roof) with the features of the characterizing clause of claim 1.

An adjustment device of this type is known from the state of the art in DE 43 29 583 C1. The lamellas of this vehicle roof are adjacent to one another in the closed position and form a plane-surface, interlinked lamella system with each other, as well as with the roof surface of the vehicle. Each lamella is guided on its narrow sides with dowel pins along guide elements fixed to roof. In so doing, the dowel pins are held in an interlock with the guide elements in the entire adjustment area of the lamellas. When the lamellas are opened, the plane-surface, interlinked lamella system is undone by swinging up each lamella, one after the other, of the vehicle sliding roof; or, as the case may be, the system is recreated when the vehicle sliding roof is closed.

Two neighboring, adjacent lamellas are continually connected with each other in each case via a swiveling and guiding mechanism for this, though, independently of whether the vehicle sliding roof is closed or open. This is why guide rails essentially extending over the entire length of the lamella are located on the longitudinal edges of every single lamella.

This not only leads to an expensive and complicated guidance mechanism, but also results in increased weight of the lamellas because of the additional guide rails on the lamellas. The minimum spacing of the lamellas that can be achieved in their open position with regard to each other is limited by the additional guide rails likewise sticking out of the surface of the vehicle roof in the upright position.

The technical problem of creating an adjustment device for a vehicle sliding roof consisting of lamellas that can be swiveled and moved, which has a simple structure and which can nevertheless be operated dependably and which is stable, therefore forms the basis of the invention.

The technical problem that was previously indicated is solved, in accordance with the invention, with an adjustment device for a vehicle sliding roof with the features of claim 1. In accordance with the invention, a drive carriage is provided that is arranged so as to be movable in the guide element fixed to the vehicle in front of the lamella support carriages and that is connected with the adjustment drive unit of the vehicle sliding roof, on the one hand; on the other hand, swiveling and coupling elements are provided from which the one set of lamella elements between the drive carriage and the first lamella support element act, as well as the other ones between the lamella support carriages and the neighboring lamella support elements in each case. When the vehicle sliding roof is opened, the swiveling and coupling elements only engage with each other at stipulated positions and, when it is closed, they go to the stipulated positions again, disengaged from each other.

With an adjustment device of this type, the opening and closing sequence is such that the lamella in front in the direction of motion of the vehicle is first swiveled and pushed backwards, and the subsequent lamellas are accordingly moved one after the other; closing takes place in the reverse order.

In the closed position, the lamella support carriages are spatially separated from the assigned lamella support elements of two neighboring lamellas of the vehicle sliding roof in each case and not coupled with each other. Neighboring lamella support carriages (or the drive carriage) and lamella support elements are only coupled with each other, while the accompanying lamella swivels, and pushed along the vehicle roof opening on the grounds of this mechanical coupling, when the swiveling and coupling elements engage with each other. When the vehicle sliding roof is closed, the swiveling and coupling elements then get to the stipulated positions again without being engaged, so that the mechanical coupling between the drive or lamella support, on the one hand, and the respective neighboring lamella support elements, on the other hand, is undone.

In the case of an adjustment device in accordance with the invention, the entire mechanism is comparably compact and simply designed, so that only a little bit of space is taken up by the adjustment device. The minimum spacing of the opened lamellas to each other can also be less than is the case with the vehicle sliding roofs that are known.

In the preferred way, the control elements of the lamella support elements secure the lamellas in their position in the operating phases in which the swiveling and coupling elements engage or disengage. After the swiveling and coupling elements disengage from each other during the closing, or before they engage with one another during opening, no other adjustment forces act on the lamella support carriages or the lamella support elements of the lamellas already in the closed position, so the lamellas remain in their closed position.

The swiveling and coupling elements that act between the lamella support carriages, or the drive carriage, and lamella support elements of neighboring lamellas engage with each other during the opening process, and the assigned lamella support element is swiveled into the open position and—essentially subsequently—moved. The mechanical coupling between neighboring carriages continues to be effected because of the engagement of the swiveling and coupling elements, so a towing interlock exists during the closing process between the coupled carriages that is pulled by the drive carriage along at least the one guide element. The swiveling and coupling elements disengage again at the stipulated positions during the closing process; the rear lamella support element in each case of the towing interlock is swiveled into the closed position in the process. The decoupling between the drive carriage and the neighboring lamella support carriage, or between two neighboring lamella support carriages, is therefore brought about with, or directly after, the swiveling down of a lamella. The situation consequently arises that the individual carriages and therefore the lamellas as well are mechanically decoupled when there is a closed vehicle sliding roof.

In the preferred way, the swiveling and coupling elements are designed as a first control cam and a first connecting link. In the process, the first control cam is connected with the lamella support element, whereas the first connecting link guide is designed into the drive carriage, or the neighboring lamella support carriages as the case may be—or the other way around. During the opening of the vehicle sliding roof, the first control cam that is affected in each case engages with the assigned, first connecting link, which is preferably open, on the side turned to it. While the first control cam is moved in the first, assigned connecting link, the curved form of the connecting link defines the swiveling movement of the lamella support element around the swivel pin.

In a further preferred way, the control elements define the amount by which the lamella to be swiveled in each case is moved during the swiveling phase of the lamellas along the guide element. The complicated movement that is comprised of a translational and a swiveling movement at the start of the opening or at the end of the closing can consequently be precisely stipulated by a suitable design of the control elements. This is, among other things, of great significance at the start of the opening process or at the end of the closing process in view of the load on the seals located between the individual lamellas.

In a particularly preferred way, the control elements are designed as a second control cam and as a second connecting link; the second control cam is planned, in so doing, as being on the lamella support element and the second connecting link in one or both side parts fixed to the vehicle. The positioning angle of the lamella is (also) defined by the form of the connecting link in every position of the lamella relative to the vehicle roof because the second control cam is continually engaged with the assigned connecting link. Because the first control cam is also defined in its position relative to the vehicle roof by the first connecting link, in addition to the second control cam.

In a preferred design form, it is further planned that the first control cam is located in the direction of motion of the vehicle in front of the swivel pin and the second control cam is located behind the swivel pin—or the other way around. A maximum distance between the support points of every lamella, with reference to the length of the lamella support element, consequently results, so that sufficient stability of the upright lamella is ensured, especially with regard to the impacting forces of the wind when moving, despite the compact design of the adjustment device.

The components that are mentioned above, as well as the ones that are required and that are to be used in accordance with the invention and that are described in the design examples, are subject to no special, exceptional conditions with regard to their size, form design, material selection or technical conceptual design, so the familiar selection criteria in the area of applicability can be used without restriction. Further individual details, features and advantages of the object of the invention result from the following description of the accompanying drawing, in which—as an example—a preferred design instance of the adjustment device in accordance with the invention is presented. In the drawing:

Figure 1:
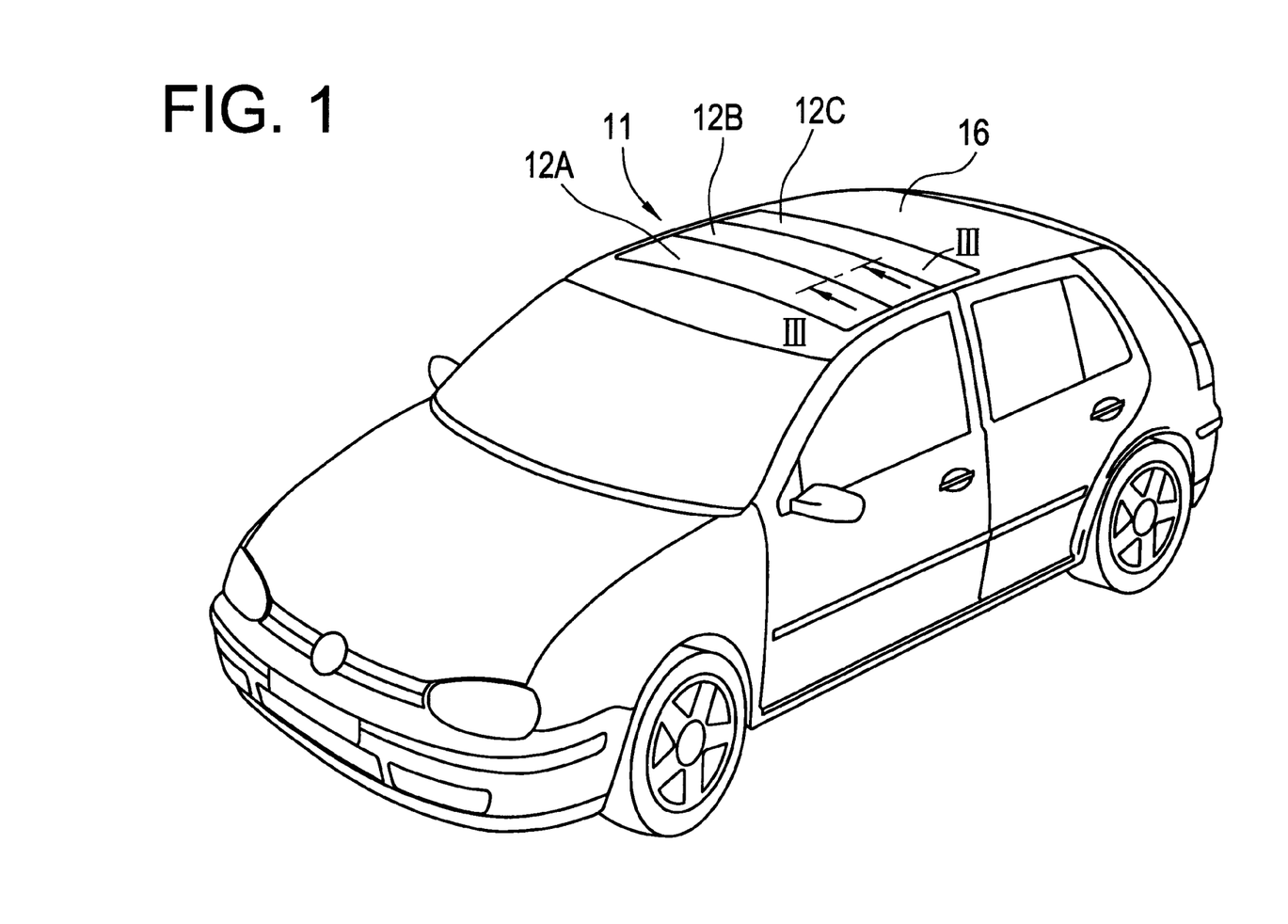
FIG. 1 shows a motor vehicle with a vehicle sliding roof consisting of lamellas in the closed position.
Figure 2:
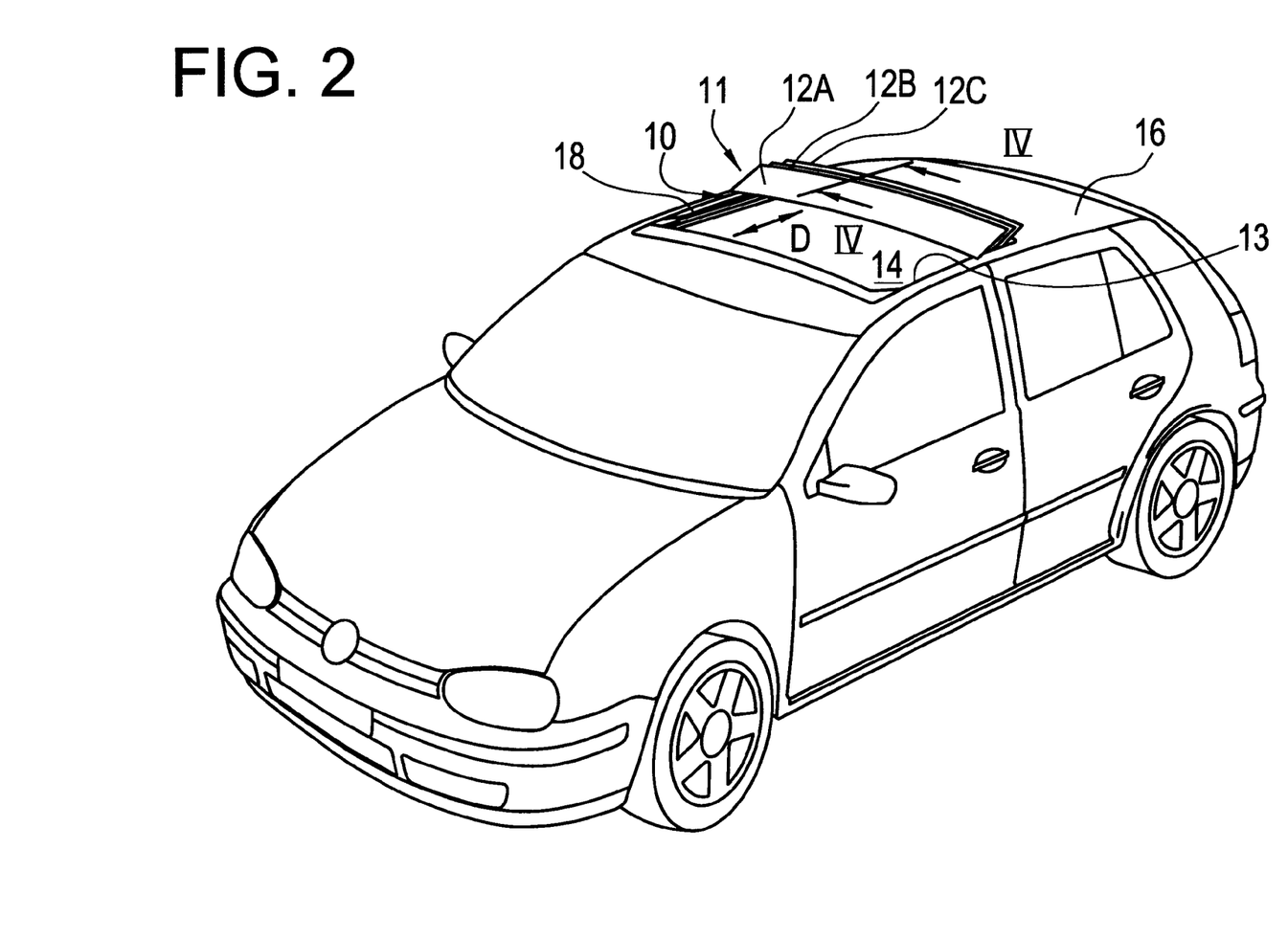
FIG. 2 shows the motor vehicle presented in FIG. 1 with the vehicle sliding roof in the open position.

A motor vehicle is presented in FIGS. 1 and 2 that is provided with an adjustment device 10 in accordance with the invention for a vehicle sliding roof 11, having a multitude of lamellas 12A, 12B and 12C for one's choice of closing and at least partially uncovering a roof opening 14 in a fixed roof surface 16 of the vehicle. The roof opening 14 has a base part 13 with opposing side parts 18 defining a longitudinal direction D. Furthermore, the lamellas 12A, 12B and 12C are arranged so as capable of being swiveled around an essentially horizontal axis and moved along the longitudinal direction D.

Figure 3:
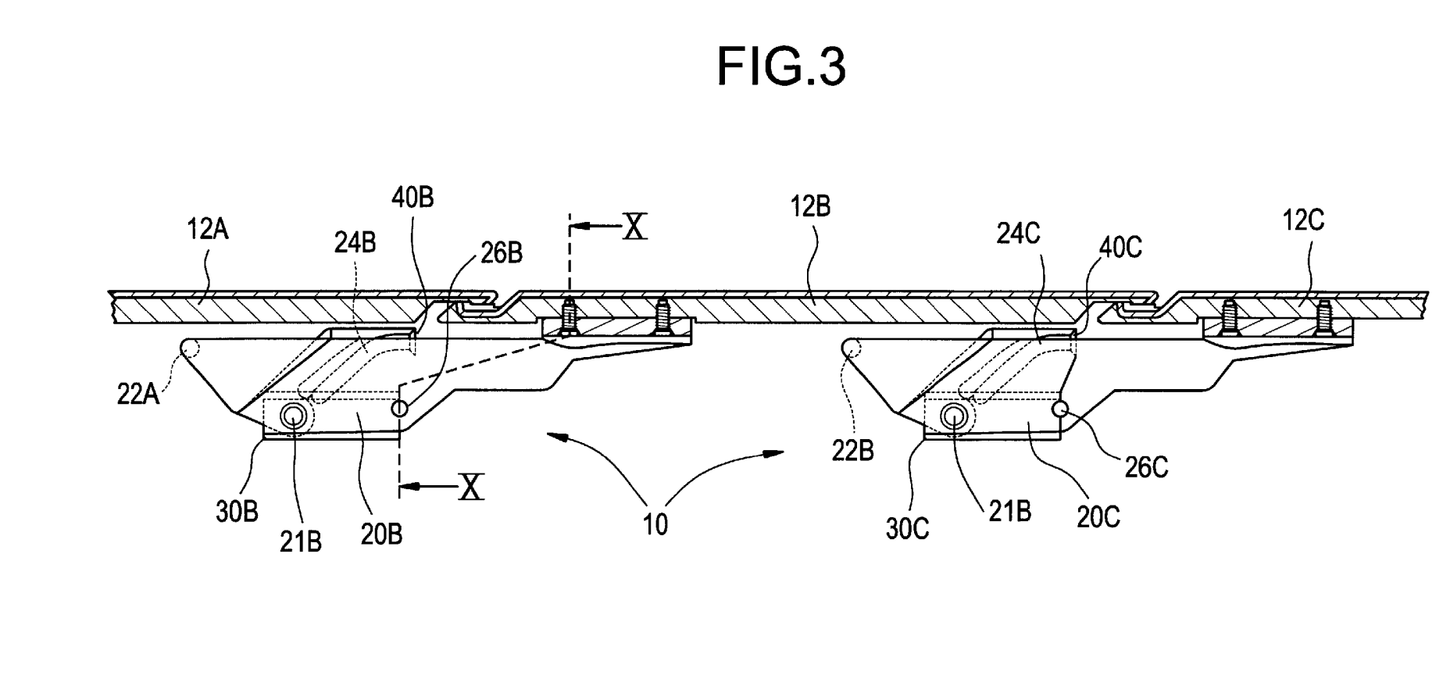
FIG. 3 shows the adjustment device in accordance with the invention in a closed position in a cross-section along the Line III—III in FIG. 1.
Figure 4:
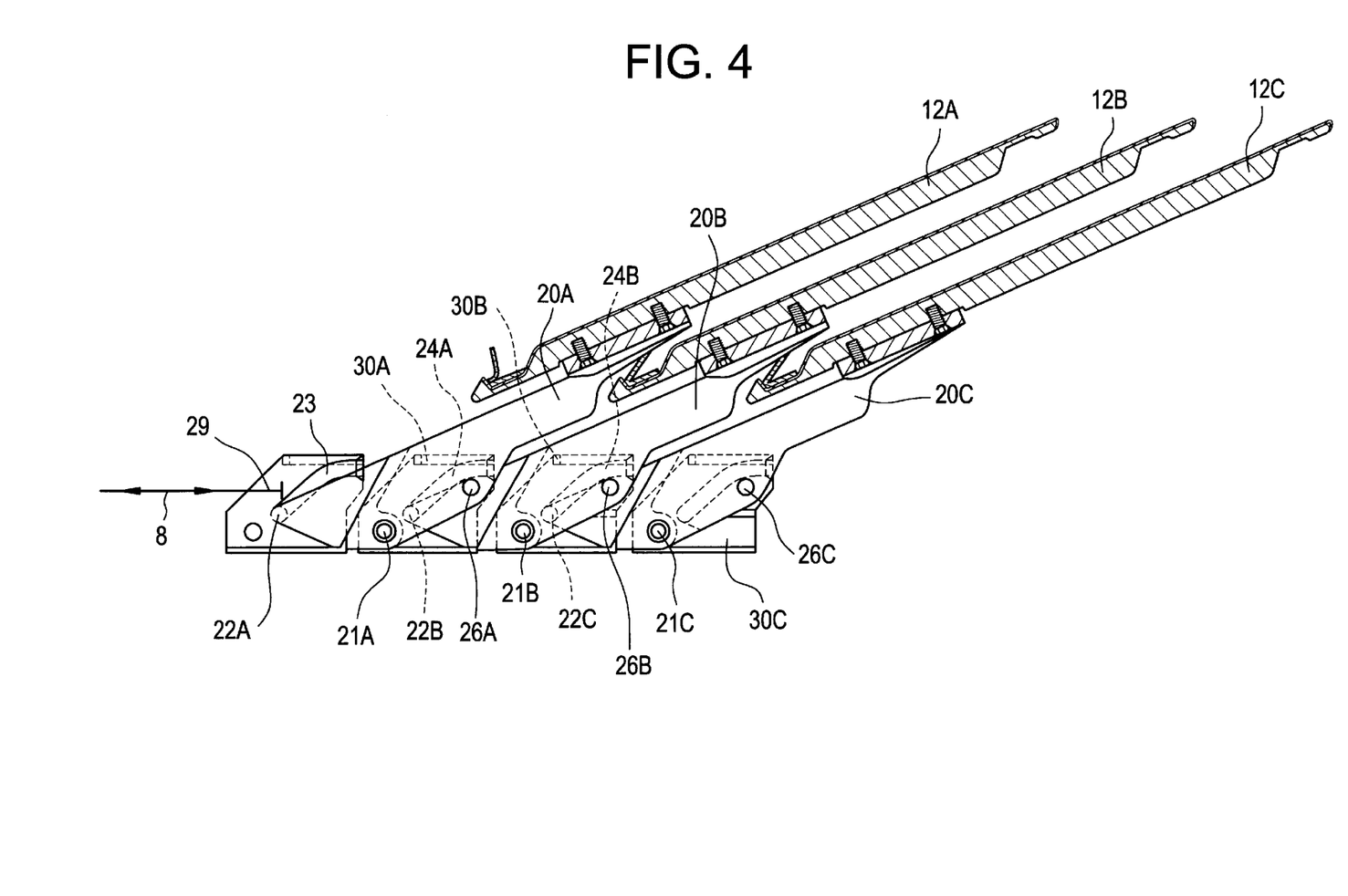
FIG. 4 shows the adjustment device presented in FIG. 3 in an open position in a cross-section along the Line IV—IV in FIG. 2.

The adjustment device is presented in FIGS. 3 and 4 in a closed position and an open position of the vehicle sliding roof 11. The adjustment device 10 has at least one lamella support element 20A, 20B and 20C in each case, which is connected with the assigned lamella 12A, 12B and 12C, for each of the lamellas 12A, 12B and 12C.

One lamella support element 20A, 20B or 20C each is fastened to each lamella 12A, 12B and 12C at the ends adjacent to the side parts 18 in the design example that is presented. The lamella support element 20A, 20B, 20C is arranged so as to be capable of swiveling around a swivel pin 21A, 21B, 21C running crosswise to the longitudinal direction D. The lamella support element 20A, 20B, 20C can likewise be moved along the longitudinal direction D, as is described below.

The adjustment device 10 has two guide elements 32 arranged on the base part 13 or on the side parts 18, extending along the longitudinal direction D. Lamella support carriages 30A, 30B, 30C are located in a movable fashion along the guide elements 32; two lamella support carriages 30A, 30B, 30 C each are provided for each of the lamellas 12A, 12B and 12C. The lamella support carriages 30A, 30B, 30C are provided for adjusting the lamellas 12A, 12B, 12C connected to the lamella support elements 20A, 20B, 20C. The swivel pins 21A, 21B, 21C, which are connected to the lamella support carriages 30A, 30B, 30C, extend through appropriately-designed holes 30A, 38B, 38C for this, which are designed into the lamella support elements 20A, 20B, 20C.

As presented in FIG. 4, a drive carriage 29 is provided that is arranged so as to be movable in the guide element 32 in front of the lamella support carriages 30A, 30B, 30C; the drive carriage 29 is not connected to a lamella support element. The drive carriage 29 is therefore exclusively for driving the adjustment of the lamella support carriages 30A, 30B, 30C and not for holding one of the lamellas of the vehicle sliding roof 11. The drive carriage 29 is connected with an adjustment drive unit not shown in the drawing for this, which makes an adjustment of the drive carriage 29 possible in the direction of the open position, as well as in the direction of the closed position, along the direction D. A drive cable 8 fastened to both ends of the drive carriage 29, which extends at least over the entire length of the vehicle sliding roof 11 and which is routed in the form of a loop, serves as an adjustment drive unit in the process. Furthermore, the drive cable 8 is connected with a motor-type drive unit to actuate the drive carriage 29.

In accordance with the invention, swiveling and coupling elements are now provided that essentially consist in each case of a first control cam 22A, 22B, 22C and a first connecting link 23, 24A, 24B. The first control cam 22A, 22B, 22C is connected with the corresponding lamella support element 20A, 20B, 20C. Further, the first connecting link 23 is designed into the drive carriage 29 and the first connecting links 24A and 24B are designed into the lamella support carriages 30A, 30B. This can particularly be noted in detail in FIGS. 5 and 6, which show a lamella support element 20, and in FIG. 7, which shows a lamella support carriage 30. Furthermore, the first connecting link 23, 24A, 24B has an input area 40A, 40B, 40C at the open end, designed in the shape of a cone, in order to make the engagement of the first control cams 22A, 22B, 22C with the first connecting link 23, 24A, 24B easier if it should occur, on the grounds of mechanical play, that the first control cam 22A, 22B, 22C does not run directly on the path defined by the first connecting link 23, 24A, 24B.

As presented in FIG. 3 with the aid of the lamella support carriages 30B and 30C for a closed vehicle sliding roof 11, the first control cam 22C and the first connecting link 24B are not engaged, but the lamella support carriages 30B and 30C, and consequently the lamella support elements 20B and 20C, are arranged at a distance from one another. No overlapping of the two lamella support elements 20B and 20C comes about, consequently. As is explained in detail further below, the first control cams 22A, 22B, 22C engage with the corresponding first connecting links 23, 24A, 24B at the stipulated positions, whereas they disengage from each other again during the closing of the vehicle sliding roof 11.

A mechanical coupling of the drive carriage 29 and the lamella support carriages 30A and 30B to the lamella support elements 20A, 20B, 20C is consequently first brought about during the opening process; these mechanical couplings are each undone again during the closing process. It therefore turns out, advantageously, that the adjustment device in accordance with the invention has a compact structure and is consequently designed so as to be space-saving.

Furthermore, control elements are provided that consist of a second control cam 26A, 26B, 26C and a second connecting link 28A, 28B, 28C in each case for guiding the movement, which is made up of swiveling movement and linear movement, of the lamellas 12A, 12B, 12C. As presented in FIGS. 5 and 6, the second control cams 26A, 26B, 26C are connected with the lamella support elements 20A, 20B, 20C, specially designed in one piece. Further, the second connecting links 28A, 28B, 28C are designed into the side part 18 respectively assigned to them. When installed, the second control cam 26A, 26B, 26C is engaged in each case with the assigned second connecting link 28A, 28B, 28C, so a precisely-stipulated position of the second control cam 26A, 26B, 26C is defined over the entire range of movement of the lamella support element 20A, 20B, 20C or of the assigned lamella support carriage 30A, 30B, 30C. Because the height position of the second control cam 26A, 26B, 26C is defined for every position along the direction D by the form of the second connecting link 28A, 28B, 28C. The precise movement path of the lamella support element 20A, 20B, 20C is defined, in addition, because the sequence of movement of each lamella support element 20A, 20B, 20C is determined via the first control cam 22A, 22B, 22C in interaction with the first connecting link 23, 24A, 24B.

Figure 9:
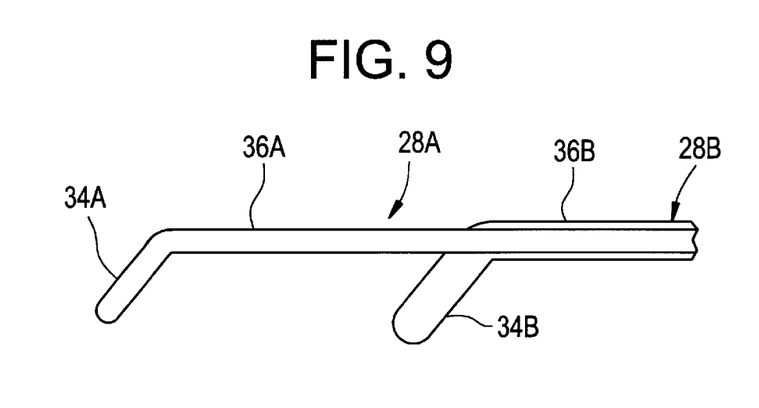
FIG. 9 shows a design of the second connecting link of the adjustment device in accordance with the invention in a schematic diagram.

The form of two second connecting links 28A and 28B selected in the design example at hand is presented in a schematic form in FIG. 9. The two connecting links 28A and 28B have a section 34A, 34B running at a slant and a section 36A, 36B oriented horizontally. If the second control cam 26A is located at the lower end of the slanted section 34A of the second connecting link 28A, the lamella support element 20A is arranged in its downward-swiveled position, so the assigned lamella 12A is in its closed position. Now if the second control cam 26A runs along the slanted section 34A of the second connecting link 28A during the opening process, both a linear movement and a swiveling movement of the lamella support element 20A takes place. If the second radical cam 26A goes into the horizontal section 36A of the second connecting link 28A after this, the lamella support element 20A remains in its upright position and is pushed backwards in this position with a further opening of the vehicle sliding roof 11. The closing process accordingly runs the other way around. It is consequently ensured that the second control cams 26A, 26B, 26C and the second connecting links 28A, 28B, 28C define the amount by which the lamella to be swiveled in each case moves along the guide element 32 during the swiveling of the lamella 12A, 12B, 12C.

Figure 10:
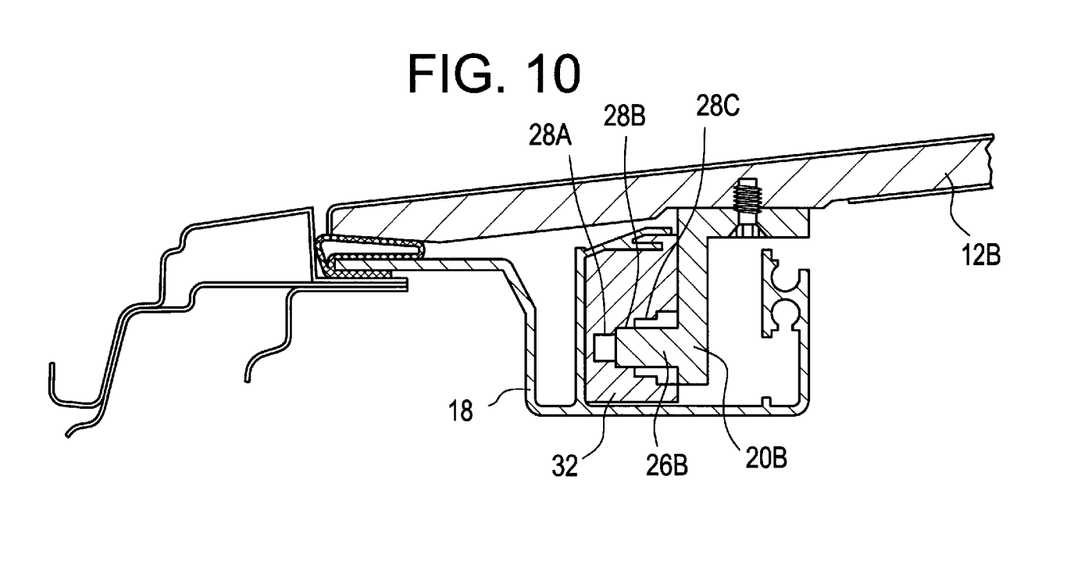
FIG. 10 shows the adjustment device in accordance with the invention in a cross-section along the Line X—X in FIG. 1.

The engagement of the second control cam 26B in the second connecting link 28B is presented in FIG. 10. FIG. 10 further shows that the second connecting links 28A, 28B, 28C are designed in a staggered form, so with various widths in the guide element 32. The guide element 32 is held by the side part 18, designed as a support frame, in the process.

Figure 11:
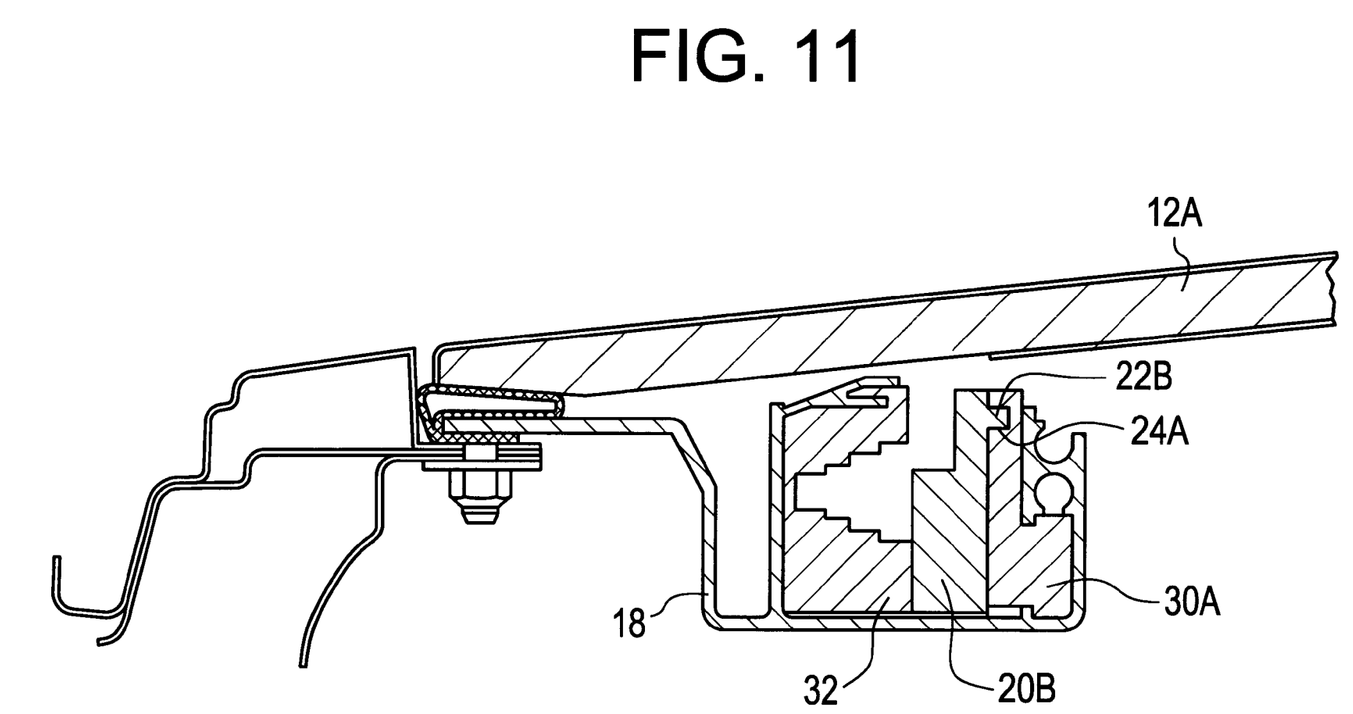
FIG. 11 shows the adjustment device in accordance with the invention in a cross-section along the Line XI—XI in FIG. 1.

The status in which the first control cam 22B of the lamella support element 20B is engaged with the first connecting link 24A of the lamella support carriage 30A in the upper range of the first connecting link 24A, in contrast, is presented in FIG. 11. FIG. 11 consequently shows the position in which the swiveling and coupling elements in accordance with the invention are engaged with each other during the opening of the vehicle sliding roof 11, or disengaged during the closing process of the vehicle sliding roof 11.

Figure 5:
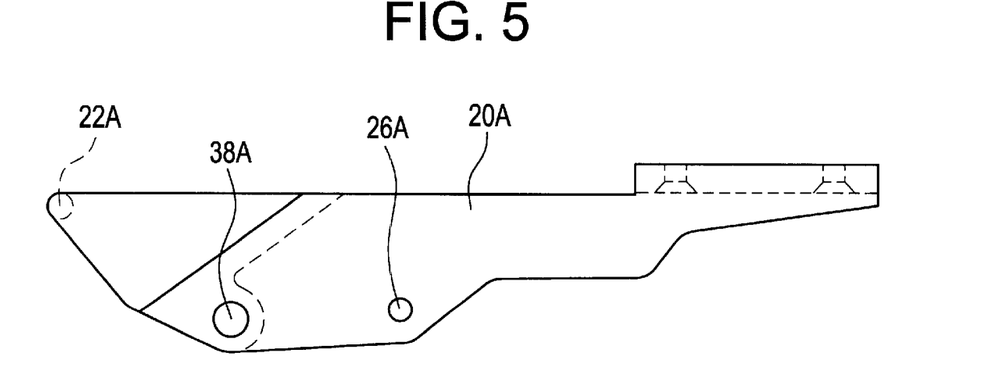
FIG. 5 shows a lamella support element of the adjustment device in accordance with the invention in a side view.
Figure 6:
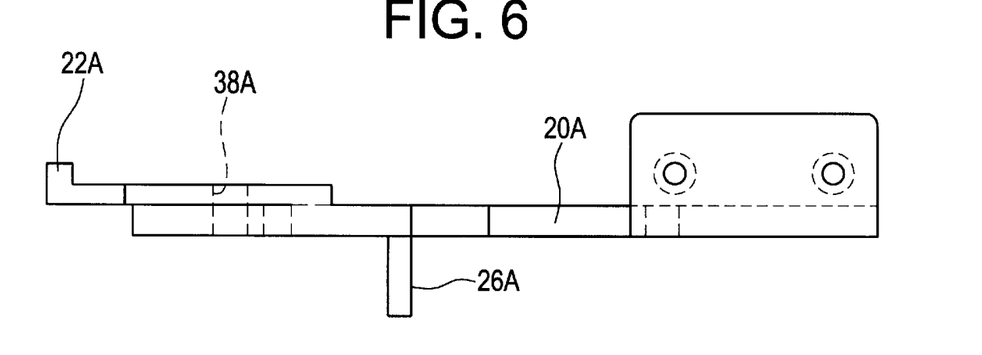
FIG. 6 shows the lamella support element presented in FIG. 5 in a view from above.

As can be further noted in FIGS. 4, 5 and 6, the first control cam 22A is located in front of the swivel pin 21A in the direction of the drive carriage 29, and the second control cam 26A is located behind the swivel pin 21A. This leads to increased stability, especially when lamella 12 is upright, because the two external set-down or support points that are formed by the two control cams 22A and 26A have a relatively large spacing from each other. The lever forces exerted by the upright lamella 12 can consequently be accepted in a suitable form.

The manner of functioning of the adjustment device in accordance with the invention is explained in detail below for the opening process, as well as for the closing process.

In the closed state of the vehicle sliding roof 11, the lamellas 12A, 12B, 12C are arranged so as to lie in the plane of the vehicle roof, and the drive carriage 29 and the lamella support carriages 30A, 30B, 30C, as well as the lamella support elements 20A, 20B, 20C, connected with them in a way such that they are capable of swiveling, are arranged at a distance from each other. The swiveling and coupling elements that are formed by the first control cams 22A, 22B, 22C and the first connecting links 23, 24A, 24B, are consequently not engaged with each other. If the drive carriage 29 is moved in direction D towards the neighboring lamella support carriage 30A with the aid of the adjustment drive unit at the start of the opening process, the first control cam 22A and the first connecting link 23 of the drive carriage 29 engage with each other.

Figure 7:
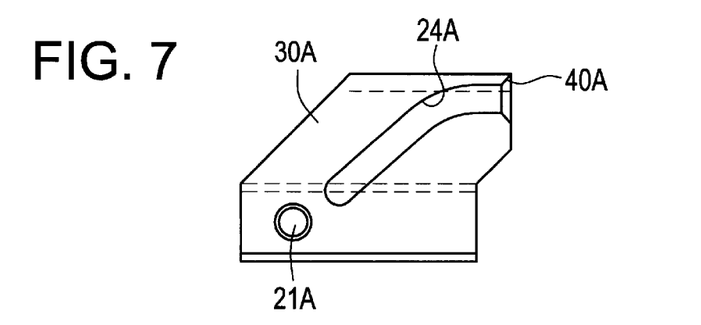
FIG. 7 shows a lamella support carriage of the adjustment device in accordance with the invention in a side view.
Figure 8:
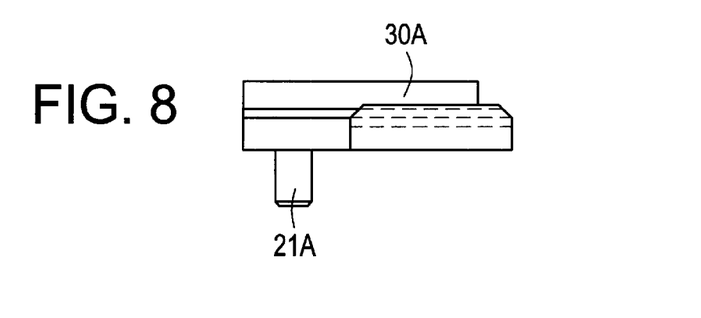
FIG. 8 shows the lamella support carriage presented in FIG. 7 in a view from above.

The first control cam 22A is moved both in the horizontal direction, as well as in the vertical direction, long the curved path of the connecting link 23, which can particularly be seen in FIG. 7, with a further movement in the direction of the open position. The lamella support element 20A is swiveled around the swivel pin 21A because of this, so that the second control cam 26A is shifted in the assigned second connecting link 28A along the slanted section 34A. This results in the lamella 12A, simultaneously with the lamella support element 20A, being swiveled upwards and shifted in a linear fashion in the direction of the open position at the start of the upright movement of lamella 12A. During the further shifting of the drive carriage 29 in the direction of the open position, the first control cam 22A comes to rest on the lower end of the first connecting link 23. The swiveling process of the lamella support element 20A is consequently concluded; the second control cam 26A is simultaneously located at the start of the horizontal section 36A of the second connecting link 28A in the process. A further shifting of the drive carriage 29 in the direction of the open position of the vehicle sliding roof only brings about a horizontal movement of the upright lamella 12A then.

Not just a shifting of the lamella 12A is brought about during the engagement of the first swivel pin 21A with the connecting link 23, but a coupling between the drive carriage 29 through the lamella support element 20A with the lamella support carriage 30A is also created. Because the first control cam 22A is held at the lower position within the connecting link 23 due to the control elements, thus the second control cam 26A and the second connecting link 28A, the swiveling and coupling elements cannot disengage with each other.

The swiveling and coupling elements engage with each other in the manner previously described because the first cams 22B and 22C, as well as the first connecting links 24A and 24B, are designed in the same way.

The adjustment drive unit is operating in the reverse direction during the closing process, so the drive carriage 29 shifts the lamella support 30A, 30B, 30C that are mechanically coupled to it in the direction of the closed position of the vehicle sliding roof 11. If, as an example, the second control cam 26A is shifted from the horizontal section 36A into the slanted section 34A within the second connecting link 28A, the swiveling of the lamella support element 20A starts in the direction of the closed position. The first control cam 22A is moved upwards along the connecting link 23 because of this, unit the first control cam 22A disengages with the first connecting link 23. The assigned lamella 12A reaches its closed position right at this point in time, and the lamella support carriage 30A remains in the position it has reached in this way during the further shifting of the drive carriage 29, because mechanical coupling no longer sexists between the drive carriage 29 and the lamella support carriage 30A.

Reference symbol list

8 Drive cable
10 Adjustment device
11 Vehicle sliding roof
12 Lamellas
13 Base part
14 Roof opening
16 Roof surface
18 Side parts
20 Lamella support element
21 Swivel pin
22 First control cam
23 First connecting link
24 First connecting link
26 Second control cam
28 Second connecting link
29 Drive carriage
30 Lamella support carriage
32 Guide element
34 Slanted section of 28
36 Horizontal section of 28
38 Hole in 20
40 Conical input area of 23, 24
D Longitudinal direction Summary In the case of an adjustment device for a vehicle sliding roof (11), having at least two lamellas (12A, 12B, 12C), and in which the roof opening (14) to be closed is limited by a base part (13) fixed to the vehicle with side parts (18) opposite one another,
　with lamella support elements (20A, 20B, 20C) that can be swiveled around swivel pins (21A, 21B, 21C) running cross-wise to the direction of movement (D) and that can be moved along the direction of motion (D),
　with lamella support carriages (30A, 30B, 30C) that are guided along guide elements (32) so as to be capable of being moved along the direction of motion (D) and that move the assigned lamellas (12A, 12B, 12C),
　with control elements (26A, 28A; 26B, 28B; 26C, 28C) that define the movement of the, lamella support elements (20A, 20B, 20C) during the motion and
　with drive elements (8) for opening and closing the vehicle sliding roof,
a drive carriage (29) is provided that is arranged so as to be movable in the guide element (32) in front of the lamella support carriages (30A, 30B, 30C) and
swiveling and coupling elements for swiveling a lamella and for connecting and disconnecting again two carriages; one set of which acts between the drive carriage (29) and the first lamella support element (20A) and the others acting between the lamella support carriages (30A, 30B) and the respective, neighboring lamella support elements (20B, 20C), and which engage at stipulated positions when the vehicle sliding roof (11) is opened and which disengage from each other again at the stipulated positions when the vehicle sliding roof (11) is closed.

What is claimed is:

1. Adjustment device for a vehicle sliding roof (11), having at least two lamellas (12A, 12B, 12C) for a choice of closing and at least partially uncovering a roof opening (14) in a fixed roof surface (16) of a vehicle and with which the roof opening (14) is limited by a base part (13) fixed to the vehicle with side parts (18) opposite one another, defaming a longitudinal direction (D),
　with at least one lamella support element (20A, 20B, 20C) each connected with the assigned lamella (12A, 12B, 12C), which can be swiveled around a swivel pin (21A, 21B, 21C) running cross-wise to the longitudinal direction (D) and which can be moved along the longitudinal direction (D),
　with at least one guide element (32) provided on the base part (13), extending along the longitudinal direction (D),
　with at least one lamella support carriage (30A, 30B, 30C) each per lamella (12A, 12B, 12C), which is guided along the guide element (32) so as to be movable and which moves the assigned lamella (12A, 12B, 12C),
　with control elements (26A, 28A, 26B, 28B; 26C, 28C), which define the movement of the lamella support elements (20A, 20B, 20C) during the movement of the lamella support carriages (30A, 30B, 30C) along the guide element (32) and
　with drive elements (8) for opening and closing the vehicle sliding roof, characterized by a drive carriage (29) being provided, which is arranged so as to be movable in the guide element (32), viewed in the direction of travel, in front of the lamella support carriages (30A, 30B, 30C) and which is connected with the drive elements (8), and swiveling and coupling elements for swiveling a lamella and for connecting and disconnecting again two carriages being provided; one set of which acts between the drive carriage (29) and the first lamella support element (20A) and the others acting between the lamella support carriages (30A, 30B) and the respective, neighboring lamella support elements (20B, 20C), and which engage at stipulated positions when the vehicle sliding roof (11) is opened and which disengage from each other again at the stipulated positions when the vehicle sliding roof (11) is closed.

2. Adjustment device according to claim 1, characterized by the control elements securing the lamellas (12A, 12B, 12C) in their position in the operating phases in which the swiveling and coupling elements engage or disengage.

3. Adjustment device according to claim 1 or 2, characterized by the swiveling and coupling elements, while they are being engaged with each other during the opening of the vehicle sliding roof (11), swiveling the assigned lamella support element (20A, 20B, 20C) into the open position and, essentially subsequently, shifting and simultaneously bringing about a coupling between the drive carriage (29) and the following lamella support carriage (30A) or between the neighboring lamella support carriages (30A, 30B, 30C).

4. Adjustment device according to claim 3, characterized by the swiveling and coupling elements, while they disengage when the vehicle sliding roof (11) closes, swiveling the assigned lamella support elements (20A, 20B, 20C) into the closed position, the swiveling and coupling element simultaneously bring about a coupling between the drive carriage (29) and the following lamella support carriage (30A) or between the neighboring lamella support carriages (30A, 30B, 30C) when the vehicle sliding roof (11) opens.

5. Adjustment device according to claim 4, characterized by the swiveling and coupling elements being designed as a first control cam (22A, 22B, 22C) and a first connecting link (23, 24A, 24B); the first control cam (22A, 22B, 22C) is designed to be on the lamella support element (20A, 20B, 20C) and the first connecting link (23, 24A, 24B) is provided on one of the drive carriage (29) and the lamella support carriage (30A, 30B).

6. Adjustment device according to claim 5, characterized by the control elements (26A, 28A; 26B, 28B; 26C, 28C) defining the amount by which the lamellas can be swiveled in each case are moved along the guide element (32) during the swiveling of the lamella (12A, 12B, 12C).

7. Adjustment device according to claim 6, characterized by the control elements being a second control cam (26A, 26B, 26C) and a second connecting link (28A, 28B, 28C); the second control cam (26A, 26B, 26C) is provided on the lamella support element (20A, 20B, 20C) and the second connecting link (28A, 28B, 28C) is provided on the side part (18).

8. Adjustment device according to claim 7, characterized by the first control cam (22A, 22B, 22C) being arranged in front of the swivel pin (21A, 21B, 21C) and the second control cam (26A, 26B, 26C) being located behind the swivel pin (21A, 21B, 21C).

9. Adjustment device according to claim 4, characterized by the swiveling and coupling elements being designed as a first control cam (22A, 22B, 22C) and a first connecting link (23, 24A, 24B); the lamella support element has the first connecting link and the carriage the first control cam.

10. Adjustment device according to claim 1, characterized by the swiveling and coupling elements, while they disengage when the vehicle sliding roof (11) closes, swiveling the assigned lamella support elements (20A, 20B, 20C) into the closed position, the swiveling and coupling element simultaneously bring about a coupling between the drive carriage (29) and the following lamella support carriage (30A) or between the neighboring lamella support carriages (30A, 30B, 30C) when the vehicle sliding roof (11) opens.

11. Adjustment device according to claim 1, characterized by the swiveling and coupling elements being designed as a first control cam (22A, 22B, 22C) and a first connecting link (23, 24A, 24B); the first control cam (22A, 22B, 22C) is designed to be on the lamella support element (20A, 20B, 20C) and the first connecting link (23, 24A, 24B) is provided on one of the drive carriage (29) and the lamella support carriage (30A, 30B).

12. Adjustment device according to claim 1, characterized by the swiveling and coupling elements being designed as a first control cam (22A, 22B, 22C) and a first connecting link (23, 24A, 24B); the lamella support element has the first connecting link and the carriage the first control cam.

13. Adjustment device according to claim 1, characterized by the control elements (26A, 28A; 26B, 28B; 26C, 28C) defining the amount by which the lamellas can be swiveled in each case are moved along the guide element (32) during the swiveling of the lamella (12A, 12B, 12C).

14. Adjustment device according to claim 9, characterized by the control elements (26A, 28A; 26B, 28B; 26C, 28C) defining the amount by which the lamellas can be swiveled in each case are moved along the guide element (32) during the swiveling of the lamella (12A, 12B, 12C).

15. Adjustment device according to claim 1, characterized by the control elements being a second control cam (26A, 26B, 26C) and a second connecting link (28A, 28B, 28C); the second control cam (26A, 26B, 26C) is provided on the lamella support element (20A, 20B, 20C) and the second connecting link (28A, 28B, 28C) is provided on the side part (18).

* * * * *